(12) United States Patent　　(10) Patent No.: US 11,811,080 B2
Kim et al.　　(45) Date of Patent: Nov. 7, 2023

(54) BATTERY MODULE HAVING PROTECTION STRUCTURE OF CELL STACK

(71) Applicant: LG CHEM, LTD., Seoul (KR)

(72) Inventors: Hyejin Kim, Daejeon (KR); Hyunchul Choi, Daejeon (KR); Youngho Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 89 days.

(21) Appl. No.: 16/760,657

(22) PCT Filed: Dec. 2, 2019

(86) PCT No.: PCT/KR2019/016859
§ 371 (c)(1),
(2) Date: Apr. 30, 2020

(87) PCT Pub. No.: WO2020/116879
PCT Pub. Date: Jun. 11, 2020

(65) Prior Publication Data
US 2021/0226291 A1　　Jul. 22, 2021

(30) Foreign Application Priority Data
Dec. 5, 2018　(KR) .......................... 10-2018-0155515

(51) Int. Cl.
　　*H01M 50/211*　　(2021.01)
　　*H01M 50/244*　　(2021.01)
　　(Continued)
(52) U.S. Cl.
　　CPC ....... *H01M 50/211* (2021.01); *H01M 50/244* (2021.01); *H01M 50/271* (2021.01); *H01M 50/503* (2021.01)

(58) Field of Classification Search
　　CPC ... H01M 50/211; H01M 50/209; H01M 50/20
　　See application file for complete search history.

(56) References Cited

U.S. PATENT DOCUMENTS

| 8,927,124 | B2 * | 1/2015 | Moon | ................. | H01M 50/209 |
|---|---|---|---|---|---|
| | | | | | 429/7 |
| 10,601,005 | B2 | 3/2020 | Lee et al. | | |

(Continued)

FOREIGN PATENT DOCUMENTS

| CN | 103400948 A | 11/2013 |
|---|---|---|
| CN | 106450072 A | 2/2017 |

(Continued)

OTHER PUBLICATIONS

Extended European Search Report, dated Jan. 12, 2021, for European Application No. 19877536.3.

*Primary Examiner* — Maria Laios
*Assistant Examiner* — Jordan E Berresford
(74) *Attorney, Agent, or Firm* — Birch, Stewart, Kolasch & Birch, LLP

(57) ABSTRACT

A battery module according to an embodiment includes: a cell structure configured by stacking a plurality of secondary battery cells; a frame including at least one opening and configured to accommodate the cell structure in an inner space thereof through the opening; and a side plate covering the opening and including a protection cover disposed between the cell structure and the frame to cover the cell structure, wherein the protection cover may include a convex edge toward the inside of the cell structure.

18 Claims, 7 Drawing Sheets

(51) Int. Cl.
*H01M 50/271* (2021.01)
*H01M 50/503* (2021.01)

(56) References Cited

U.S. PATENT DOCUMENTS

| | | | |
|---|---|---|---|
| 10,658,716 B2 * | 5/2020 | Lee | H01M 50/20 |
| 2012/0214025 A1 | 8/2012 | Moon et al. | |
| 2017/0047562 A1 * | 2/2017 | Ogawa | H01M 10/0468 |
| 2018/0138565 A1 | 5/2018 | Lee et al. | |
| 2018/0175343 A1 | 6/2018 | Choi et al. | |
| 2018/0241017 A1 | 8/2018 | Nakamura et al. | |
| 2018/0337376 A1 | 11/2018 | Jin et al. | |
| 2019/0001838 A1 | 1/2019 | Choi et al. | |
| 2019/0245168 A1 * | 8/2019 | Qin | H01M 50/24 |
| 2019/0348720 A1 | 11/2019 | Oh et al. | |
| 2019/0389318 A1 | 12/2019 | Lee et al. | |
| 2020/0014005 A1 | 1/2020 | Lee et al. | |
| 2020/0189400 A1 | 6/2020 | Kim et al. | |

FOREIGN PATENT DOCUMENTS

| | | | |
|---|---|---|---|
| CN | 206558558 U | | 10/2017 |
| CN | 107534196 A | | 1/2018 |
| CN | 107681098 A | | 2/2018 |
| CN | 207183361 U | | 4/2018 |
| EP | 2 093 822 A2 | | 6/2009 |
| EP | 3309866 A1 | | 4/2018 |
| JP | 2017-188233 A | | 10/2017 |
| JP | 2018-518032 A | | 7/2018 |
| KR | 10-2012-0094707 A | | 8/2012 |
| KR | 10-2014-0085890 A | | 7/2014 |
| KR | 10-2017-0036639 A | | 4/2017 |
| KR | 10-2017-0083834 A | | 7/2017 |
| KR | 10-2018-0025643 A | | 3/2018 |
| KR | 10-2018-0038253 A | | 4/2018 |
| KR | 10-2018-0071800 A | | 6/2018 |
| KR | 20180071800 A | * | 6/2018 |
| KR | 10-2018-0099438 A | | 9/2018 |
| WO | WO 2017/073201 A1 | | 5/2017 |
| WO | WO 2017/150807 A1 | | 9/2017 |
| WO | WO 2018/124494 A2 | | 7/2018 |

* cited by examiner

BATTERY MODULE HAVING PROTECTION STRUCTURE OF CELL STACK

CROSS-REFERENCE TO RELATED APPLICATION(S)

This application claims priority to and the benefit of Korean Patent Application No. 10-2018-0155515 filed in the Korean Intellectual Property Office on Dec. 5, 2018, the entire contents of which are incorporated herein by reference.

The present disclosure relates to a battery module, and more particularly, to a battery module having a protection structure for a cell stack.

BACKGROUND ART

Generally, a battery module is formed by surrounding a stack in which a plurality of cells are stacked with a protection structure (for example, a metal frame) having predetermined strength.

While manufacturing the battery module, the protection structure, when combined with a cell stack, should not damage the cell stack so that the battery module may be produced well.

In the manufacture of the battery module, it is required that the protection structure and the cell stack are tightly coupled in order to optimize a volume thereof occupied in an application device (for example, an electric vehicle), and it is required that the protection structure is coupled so that the cell stack may be safely protected.

DISCLOSURE

Technical Problem

The present invention has been made in an effort to provide a battery module that may closely and tightly couple a cell stack and a protection structure while preventing the cell stack from being damaged.

However, the objective of the present invention is not limited to the aforementioned one, and may be extended in various ways within the spirit and scope of the present invention.

Technical Solution

A battery module according to an aspect of the present invention includes: a cell structure configured by stacking a plurality of secondary battery cells; a frame having an inner space and including at least one opening and configured to accommodate the cell structure in the inner space through the at least one opening; and a first side plate covering the at least one opening and including a first protection cover disposed between the cell structure and the frame to cover the cell structure, wherein the first protection cover may include a convex distal edge toward an inside of the cell structure.

The frame may be a box-shaped mono-frame in which a first opening and a second opening face each other.

The first side plate may cover the first opening and a second side plate may cover the second opening.

The first protection cover may include a first portion and a second portion extending from a side edge of the first protection cover to a boundary of the first portion, and a portion of the distal edge corresponding to the first portion may be parallel along a direction perpendicular to a longitudinal direction of the frame, while a portion of the distal edge corresponding to the second portion may have an inclined shape.

An angle between an imaginary straight line positioned in the first portion along the longitudinal direction of the frame and a straight line positioned along the distal edge of the second portion may be acute.

The distal edge has a substantially V or arc shape on a plane basis.

The frame may include at least one adhesive injection hole to fix the cell structure and the frame, and a plurality of injection holes may be disposed along the longitudinal direction of the frame and along a direction perpendicular to the longitudinal direction.

A pad may be disposed between the protection cover and the cell structure.

The frame may include at least one adhesive injection hole to fix the cell structure and the frame, and a length X of the first portion along the longitudinal direction of the frame and a partial length A of the battery cell may satisfy the following condition:

$$X > 2A, \text{ and}$$

wherein X represents a straight line distance from one end of an electrode assembly of the battery cell to the distal edge of the first protection cover, and A represents a straight line distance of a stepped portion of the battery cell along the longitudinal direction of the frame.

The frame may include at least one adhesive injection hole to fix the cell structure and the frame, and a length X of the first portion along the longitudinal direction of the frame and a partial length B of the frame may satisfy the following condition:

$$B > X > A$$

wherein X represents a straight line distance from one end of an electrode assembly of the battery cell to the distal edge of the first protection cover, B represents a straight line distance from one end of the electrode assembly of the battery cell to an inner circumferential surface of the at least one adhesive injection hole, and A represents a straight line distance of a stepped portion of the battery cell along the longitudinal direction of the frame.

The first opening may be covered by the side plate, the second opening may be covered by the second side plate, and the second side plate may include a second protection cover that is disposed between the cell structure and the frame to cover the cell structure, and the second protection cover may have a different shape than the first protection cover.

The battery cell may be formed to be of a pouch type, and the side plate may be a bus bar plate.

A battery pack according to another aspect of the present invention may include the battery module described above.

Advantageous Effects

According to the embodiment, when assembling a battery module by inserting a cell structure into a frame, it is possible to prevent a battery cell of the cell structure, by a protection cover provided on a side plate, from being damaged by the frame. Therefore, a battery module having excellent insulation performance may be manufactured.

In addition, since the cell structure and the frame may be easily coupled through a shape of the protection cover, it is possible to improve work productivity.

MODE FOR INVENTION

Figure 1:
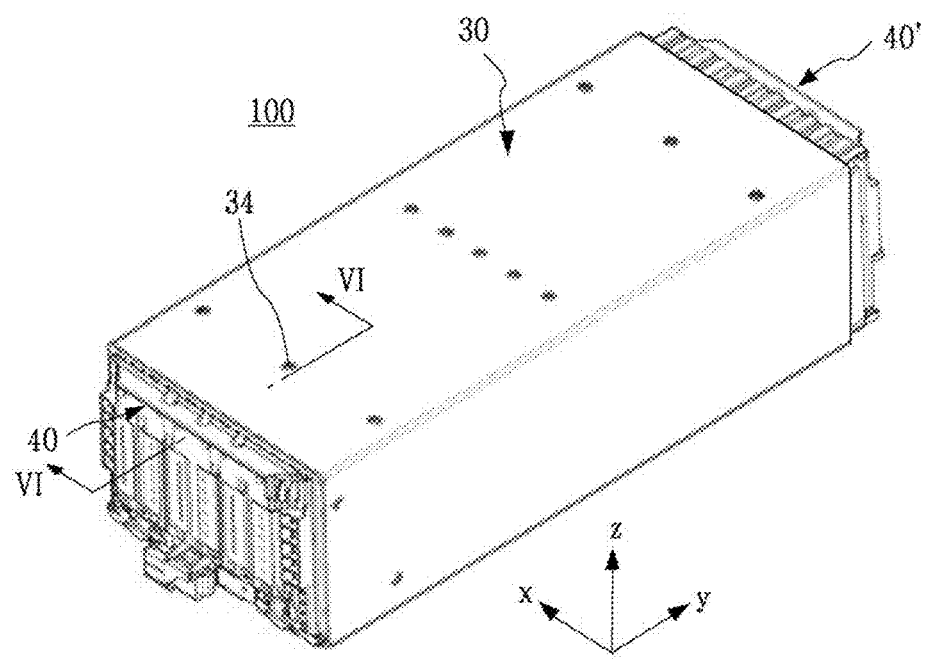
FIG. 1 illustrates a coupled perspective view of a battery module according to an embodiment of the present invention.

The present invention will be described more fully hereinafter with reference to the accompanying drawings, in which an exemplary embodiment of the invention is shown. As those skilled in the art would realize, the described embodiment may be modified in various different ways, all without departing from the spirit or scope of the present invention.

Parts that are irrelevant to the description will be omitted to clearly describe the present disclosure, and like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Hereinafter, embodiments will be described with reference to the accompanying drawings.

Figure 2:
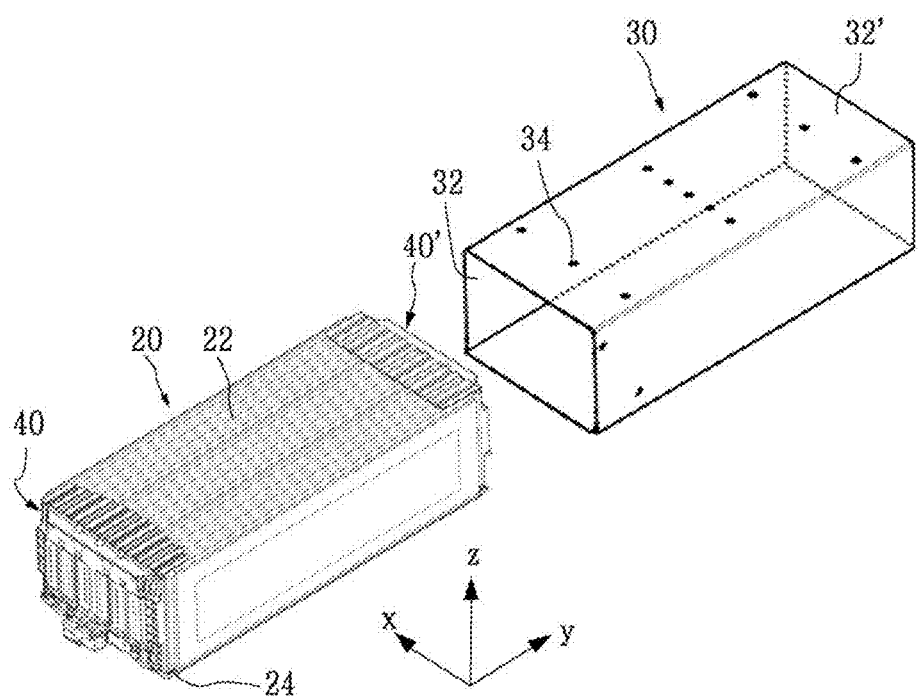
FIG. 2 illustrates an exploded perspective view of a state in which a cell structure and a frame are separated in a battery module according to an embodiment of the present invention.

FIG. 1 illustrates a coupled perspective view of a battery module according to an embodiment of the present invention, and FIG. 2 illustrates an exploded perspective view of a state in which a cell structure and a frame are separated in a battery module according to an embodiment of the present invention.

As shown in the drawings, a battery module 100 according to the embodiment has a structure in which a cell structure 20 in which a plurality of secondary battery cells 22 are stacked is inserted into an inner space of a frame 30 having a box shape.

The cell structure 20 may be configured by stacking a plurality of pouch-type battery cells 22, and a bottom plate 24 for supporting the battery cells 22 may be disposed at a bottom of the cell structure, while side plates 40 and 40' may be disposed at both ends thereof, thus the side plates 40 and 40' may be bus bar plates, each on which a bus bar for electrical connection of a plurality of battery cells 22 is disposed.

The frame 30 surrounding and protecting the cell structure 20 may be provided as a box-shaped mono-frame having at least one opening to form an inner space. In the embodiment, the frame 30 is provided as a rectangular parallelepiped mono-frame in which both of openings 32 and 32' face each other. The frame 30 may be made of a metal material to have predetermined rigidity, but is not necessarily limited thereto.

At least one surface of the frame 30 may be provided with an injection hole 34 through which an adhesive (for example, an adhesive resin) for fixing and coupling the cell structure 20 and the frame 30 may be injected. In the embodiment, the injection hole 34 may be provided in plural along a longitudinal direction (y) of the frame 30 and a direction (x) perpendicular to the longitudinal direction. The injection holes 34 may be formed to have a circular shape, and a shape and arrangement thereof are not necessarily limited to the state as shown in the drawings.

Figure 3:
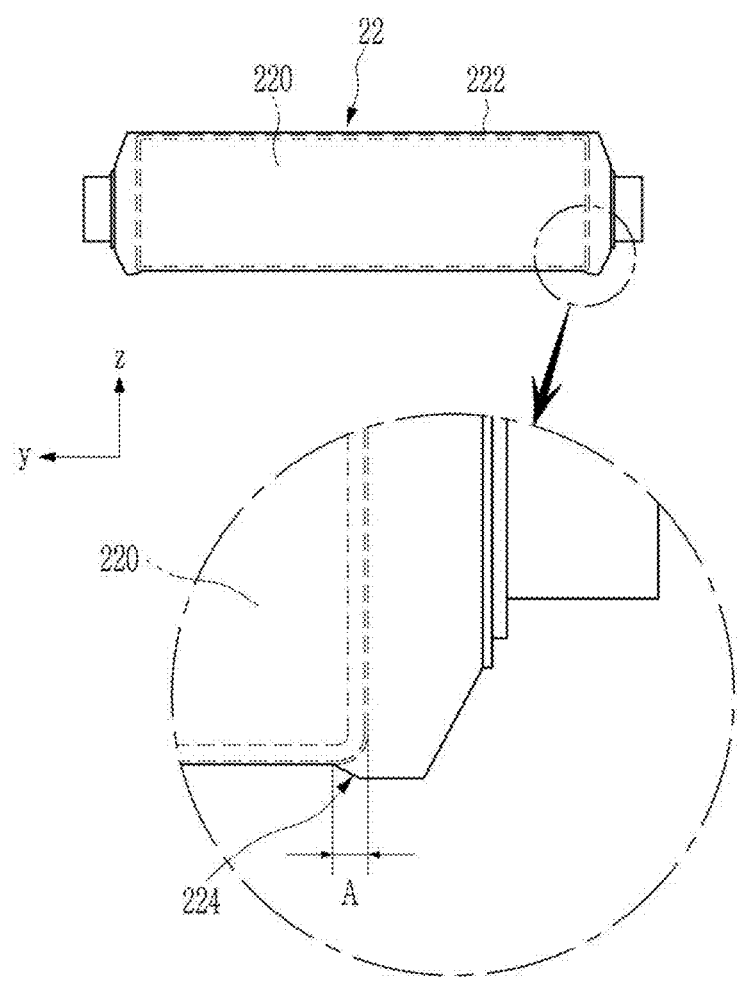
FIG. 3 illustrates a view of a battery cell according to an embodiment of the present invention.

FIG. 3 is a view schematically illustrating the battery cell 22 according to an embodiment, wherein the battery cell 22 is formed in a form of an encapsulating pouch 222 in which an electrode assembly 220 is accommodated.

As illustrated in an enlarged circle of FIG. 3, the battery cell 22 may include a stepped portion 224 that is formed due to a manufacturing process condition, a structure of the battery cell, and the like during the manufacturing process thereof. The stepped portion 224 may have a protruding shape compared to other portions of the pouch 222.

Therefore, a kind of barrier is formed in the cell structure 20 due to the respective stepped portions 224 of the plurality of battery cells 22, and the barrier may cause interference with the frame 30 when the frame 30 is fitted to the cell structure 20. When the interference occurs between them, a corresponding portion of the pouch 222 is damaged, and such damage may degrade insulating characteristics of the battery cell 22.

In the present embodiment, in order to prevent this, a protection cover is provided on at least one of the side plates 40 and 40'.

Figure 4:
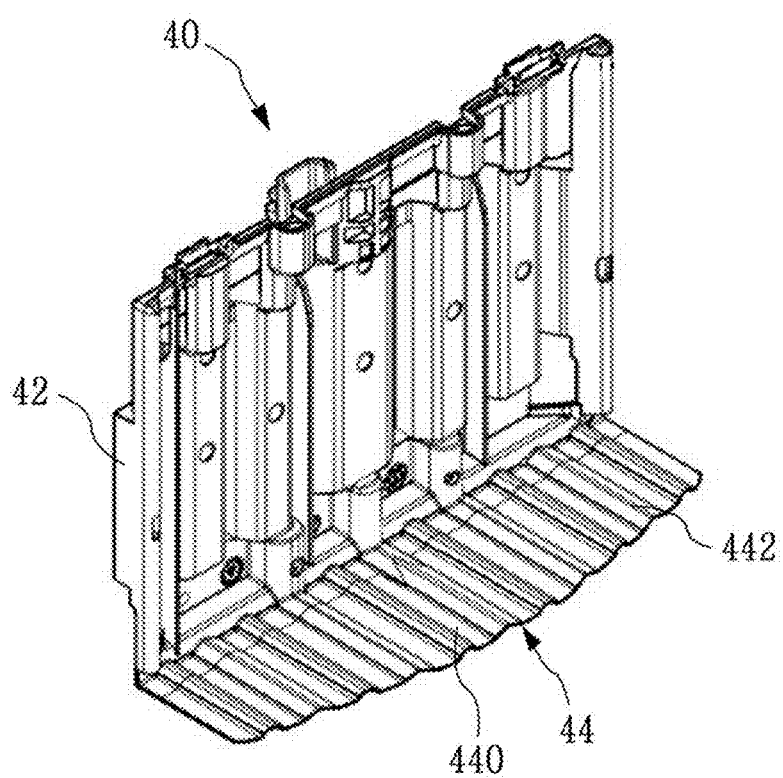
FIG. 4 illustrates a perspective view of a side plate in a battery module according to an embodiment of the present invention.
Figure 5:
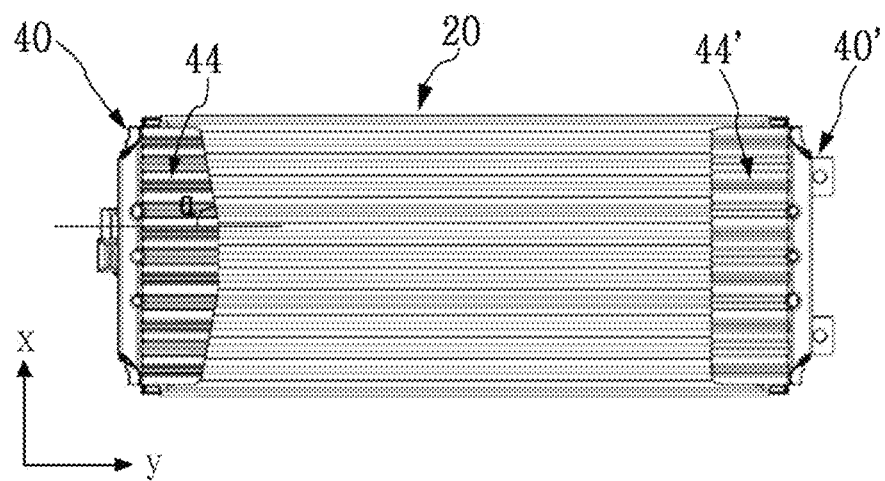
FIG. 5 illustrates a plan view of a state in which a cell structure and a side plate are coupled in a battery module according to an embodiment of the present invention.
Figure 6:
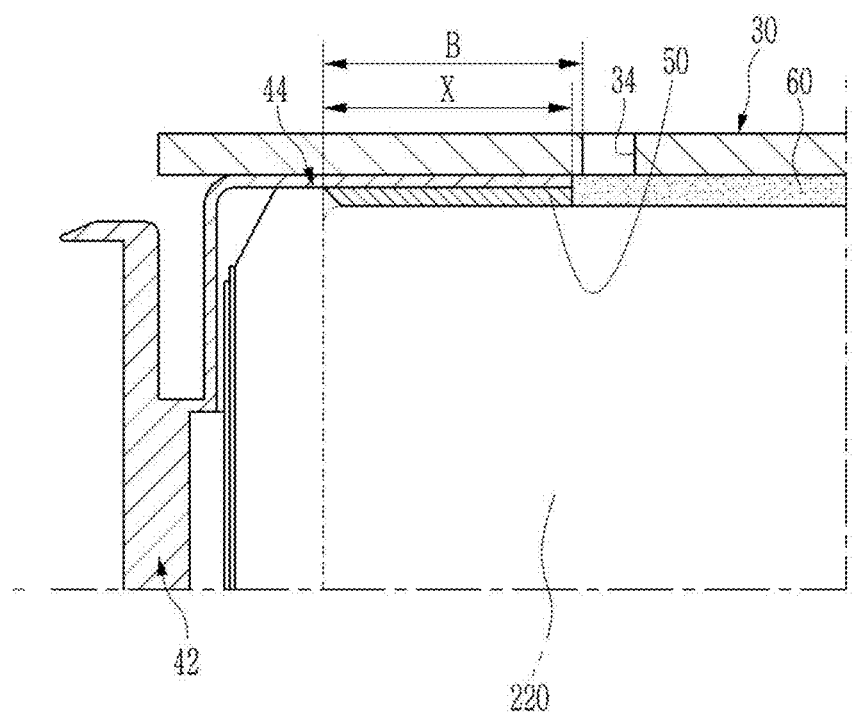
FIG. 6 illustrates a partial cross-sectional view taken along line VI-VI of FIG. 1.

FIG. 4 illustrates a perspective view of a side plate in a battery module according to an embodiment of the present invention. FIG. 5 illustrates a plan view of a state in which a cell structure and a side plate are coupled in a battery module according to an embodiment of the present invention. FIG. 6 illustrates a partial cross-sectional view taken along line VI-VI of FIG. 1.

The side plate 40 covering the first opening 32 of the openings of the frame 30 shown in FIG. 2 includes, as shown in FIG. 4, a body 42 in which a bus bar is installed while covering the first opening 32 of FIG. 2, and a protection cover 44 extending along the longitudinal direction (y) of the frame 30 of FIG. 2 from one end of the body 42.

Referring to FIG. 2 and FIG. 4, the body 42 of the side plate 40 covers one end of the cell structure 20 corresponding to the first opening 32, and the protection cover 44 covers the barrier made by the stepped portion 224 of the plurality of battery cells 22. In addition, the protection cover 44 is disposed between the cell structure 20 and the frame 30 on the basis of a state in which the cell structure 20 and the frame 30 are coupled to each other. Referring to FIG. 6, a pad 50 may be disposed between the protection cover 44 and the cell structure 20. The pad 50 may be formed as a foam type to alleviate an impact, or may be formed of a material such as polyurethane, and may serve to protect the cell structure 20 from an external impact.

In the present embodiment, an edge of the protection cover 44 toward the inside of the cell structure 20, that is, an edge crossing the cell structure 20 along the direction (x)

perpendicular to the longitudinal direction (y) of the cell structure 20, may be formed to have a convex form toward the inside of the cell structure 20. The protection cover 44 includes a first portion 440 including a central portion and a second portion 442 extending from both ends of the protection cover 44 to a boundary of the first portion 440.

Here, an edge of the protection cover 44 corresponding to the first portion 440 is formed with a shape of a straight line extending in parallel along the direction (x) perpendicular to the longitudinal direction (y) of the frame 30. In addition, an edge of the protection cover 44 corresponding to the second portion 442 may have an inclined shape.

Referring to FIG. 5, the edge of the protection cover 44 has an acute angle between an imaginary straight line positioned in the first portion 440 along the longitudinal direction (y) of the frame 30 and a straight line positioned along an edge of the second portion 442, so that it has an approximate V shape on a plane basis.

The side plate 40 may be manufactured by injection molding so that the body 42 and the protection cover 44 form one body, and may be made of a material (for example, plastic having grade 3 or higher of a comparative tracking index (CTI)) to secure a predetermined insulation function.

Meanwhile, in the embodiment, the other side plate 40' covering the second opening 32', which is the other opening of the frame 40, has the same basic configuration as the above-described side plate 40, but a shape of a protection cover 44' may be different from that of the above-described protection cover 44. That is, the other protection cover 44' has a flattened edge of a one-line shape toward the inside of the cell structure 20 as a whole (see FIG. 5).

In addition, the second opening 32' of the frame 40 may also be covered by the side plate including the protection cover 44 described above.

As described above, in the battery module 100 of the embodiment, since the cell structure 20 is inserted into the frame 30 in the state in which the stepped portion 224 of the battery cell 22 is covered with the protection cover 44, when they are combined, although the protection cover 44 may impact the battery cell 22 of the cell structure 20, it is possible to prevent the battery cell 22 from being damaged by the protection cover 44.

Moreover, since the protection cover 44 has a shorter length of both peripheral portions (second portions) than a length of a central portion (first portion) along the longitudinal direction (y) of the frame 30, even when the protection cover 44 is inserted into the frame 30, a probability that the protection cover 44 may interfere with an inner wall of the frame 30 may be reduced. As a result, it is possible to reduce the probability of damaging the battery cell by preventing an impact to be applied to the battery cell 22 during the assembly of the cell structures 20 and the frame 30, and further, to easily achieve it.

Meanwhile, the cell assembly 20 and the frame 30 may be fixed to each other with an adhesive resin 60 provided through the injection hole 34 of the frame 30 while being coupled to each other. FIG. 6 illustrates the state in which the cell assembly 20 and the frame 30 are fixed by the adhesive resin 60.

According to the embodiment, a length (X) of the first portion 440 of the protection cover 44 along the longitudinal direction (y) of the frame 30 and a partial length (A) of the battery cell 22 may satisfy the following condition in order to prevent the stepped portion 224 of the battery cell 22 from being damaged and thus to prevent a current from leaking.

$$X > 2A$$

Herein, X represents a straight line distance from one end of the electrode assembly 220 of the battery cell 22 to an end of the protection cover 44, and A represents a straight line distance of the stepped portion 224 of the battery cell 22 along the longitudinal direction of the frame 30.

In addition, the length X of the first portion of the protection cover 44 along the longitudinal direction of the frame 30 and the partial length B of the frame 30 may satisfy the following condition in order to prevent over-injection of the adhesive resin 60 provided through the injection hole 34.

$$B > X > A$$

Herein, X represents a straight line distance from one end of the electrode assembly 220 of the battery cell 22 to an end of the protection cover 44, B represents a straight line distance from one end of the electrode assembly 220 of the battery cell 22 to an inner circumferential surface of the frame 30 in which the injection hole 34 is provided, and A represents a straight line distance of the stepped portion of the battery cell along the longitudinal direction of the frame.

Figure 7:
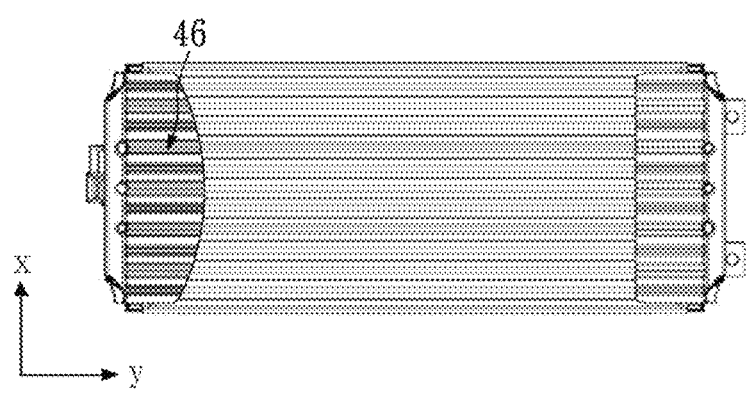
FIG. 7 illustrates a plan view of a state in which a cell structure and a side plate are coupled in a battery module according to another embodiment of the present invention.

FIG. 7 illustrates a plan view of a state in which a cell structure and a side plate are coupled in a battery module according to another embodiment of the present invention.

The embodiment of FIG. 7 has the same basic configuration as the battery module of the above-described embodiment. However, in the embodiment of FIG. 7, there is a difference in that an edge of a protection cover 46 is configured to have an arc shape on a plane basis.

The battery module described above may be configured as a battery pack and applied to various devices. These devices may be applied to a transportation apparatus such as an electric bicycle, an electric vehicle, a hybrid vehicle, and the like, but are not limited thereto, and may be applied to various devices that can use the secondary battery.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: battery module 20: cell structure
22: battery cell 30: frame
40: side plate 44: protection cover
224: stepped portion 34: injection hole

The invention claimed is:
1. A battery module comprising:
a cell structure configured by stacking a plurality of secondary battery cells;
a frame having an inner space and including at least one opening and configured to accommodate the cell structure in the inner space through the at least one opening; and
a first side plate including a body covering the at least one opening and a first protection cover disposed between the cell structure and the frame to cover the cell structure and extending from an edge of the body along a longitudinal direction of the frame,
wherein the first protection cover includes a left edge, a right edge, a top surface, a bottom surface and a distal surface extending between the top surface and bottom surface, the distal surface being toward a center of the cell structure along the longitudinal direction of the frame between the left edge and right edge of the first protection cover.

2. The battery module of claim 1, wherein the frame is a box-shaped mono-frame in which a first opening and a second opening face each other.

3. The battery module of claim 2, wherein the first side plate covers the first opening and a second side plate covers the second opening.

4. The battery module of claim 3, wherein the second side plate includes a second protection cover that is disposed between the cell structure and the frame to cover the cell structure, and the second protection cover has a different shape than the first protection cover.

5. The battery module of claim 1, wherein the first protection cover includes a first portion and a second portion extending from a side edge of the first protection cover to a boundary of the first portion, and
wherein a portion of the distal surface corresponding to the first portion is parallel along a direction perpendicular to the longitudinal direction of the frame, while a portion of a distal surface corresponding to the second portion has an inclined shape.

6. The battery module of claim 5, wherein an angle between an imaginary straight line positioned in the first portion along the longitudinal direction of the frame and a straight line positioned along the distal surface of the second portion is acute.

7. The battery module of claim 5, wherein the distal surface of the first protection cover has a V shape on a plane basis.

8. The battery module of claim 7, wherein a center of the distal surface of the first protection cover has a chamfered shape.

9. The battery module of claim 5, wherein the frame includes at least one adhesive injection hole to fix the cell structure and the frame, and
wherein a length X of the first portion along the longitudinal direction of the frame and a partial length A of the battery cell satisfy the following condition:

$X>2A$ wherein X represents a straight line distance from one end of an electrode assembly of the battery cell to the distal surface of the first protection cover, and A represents a straight line distance of a stepped portion of the battery cell along the longitudinal direction of the frame.

10. The battery module of claim 5, wherein the frame includes at least one adhesive injection hole to fix the cell structure and the frame, and
a length X of the first portion along the longitudinal direction of the frame and a partial length B of the frame satisfy the following condition:

$B>X>A$ wherein X represents a straight line distance from one end of an electrode assembly of the battery cell to the distal surface of the first protection cover, B represents a straight line distance from one end of the electrode assembly of the battery cell to an inner circumferential surface of the at least one adhesive injection hole, and A represents a straight line distance of a stepped portion of the battery cell along the longitudinal direction of the frame.

11. The battery module of claim 1, wherein the frame includes at least one adhesive injection hole to fix the cell structure and the frame.

12. The battery module of claim 11, wherein a plurality of injection holes are disposed along the longitudinal direction of the frame and along a direction perpendicular to the longitudinal direction.

13. The battery module of claim 1, wherein the distal surface of the first protection cover has an arc shape on a plane basis.

14. The battery module of claim 1, wherein the battery cell is a pouch type.

15. The battery module of claim 1, wherein the side plate is a bus bar plate.

16. The battery module of claim 1, wherein a width of the first protection cover is less than the width of the frame.

17. The battery module of claim 1, further comprising:
a second side plate opposite the first side plate; and
a second protection cover disposed between the cell structure and the frame to cover the cell structure,
wherein the second protection cover includes a proximal edge connected to the second side plate and a distal surface spaced from the proximal edge in the longitudinal direction, and
wherein the distal surface of the first protection cover is spaced from the distal surface of the second protection cover in the longitudinal direction.

18. A battery pack including the battery module according to claim 1.

* * * * *